(12) United States Patent
Wilson et al.

(10) Patent No.: US 9,641,626 B2
(45) Date of Patent: May 2, 2017

(54) DEFINING A USER GROUP DURING AN INITIAL SESSION

(71) Applicant: SMART Technologies ULC, Calgary (CA)

(72) Inventors: Patrick Wilson, Calgary (CA); Kathryn Rounding, Calgary (CA); Matt Mastracci, Calgary (CA); Erica Arnoldin, Calgary (CA); Eric Jansson, Calgary (CA); Benjamin Schuiling, Calgary (CA)

(73) Assignee: SMART TECHNOLOGIES ULC, Calgary (CA)

( * ) Notice: Subject to any disclaimer, the term of this patent is extended or adjusted under 35 U.S.C. 154(b) by 207 days.

(21) Appl. No.: 14/672,957

(22) Filed: Mar. 30, 2015

(65) Prior Publication Data

US 2015/0281372 A1    Oct. 1, 2015

Related U.S. Application Data

(60) Provisional application No. 61/972,677, filed on Mar. 31, 2014.

(51) Int. Cl.
| | |
|---|---|
| *G06F 15/16* | (2006.01) |
| *H04L 29/08* | (2006.01) |
| *G06Q 10/10* | (2012.01) |
| *H04W 4/08* | (2009.01) |

(52) U.S. Cl.
CPC ......... *H04L 67/141* (2013.01); *G06Q 10/101* (2013.01); *H04L 67/306* (2013.01); *H04W 4/08* (2013.01)

(58) Field of Classification Search
CPC ...... H04L 67/141; H04L 67/306; H04W 4/08; G06Q 10/101
See application file for complete search history.

(56) References Cited

U.S. PATENT DOCUMENTS

| | | | | |
|---|---|---|---|---|
| 6,302,698 | B1 * | 10/2001 | Ziv-El | G09B 7/02 434/322 |
| 7,034,853 | B2 * | 4/2006 | Cho | H04L 29/06 345/1.3 |
| 7,529,541 | B2 * | 5/2009 | Cho | H04L 29/06 370/359 |
| 7,532,206 | B2 | 5/2009 | Morrison et al. | |
| 9,325,940 | B2 * | 4/2016 | Smelyansky | G09B 5/065 |
| 9,374,307 | B2 * | 6/2016 | Castro Castro | H04L 41/0893 |
| 2006/0101150 | A1 * | 5/2006 | Cho | H04L 29/06 709/227 |

(Continued)

*Primary Examiner* — Moustafa M Meky
(74) *Attorney, Agent, or Firm* — Perkins Coie LLP

(57) ABSTRACT

A computer implement method for creating a user group is provided. In accordance with the method, a temporary session identifier is generated for a first session associated with the user group. The temporary session identifier is communicated to a display for presentation. Requests to join the first session are received from a plurality of users. The requests include the temporary session identifier. User identifiers of the plurality of users are correlated with the temporary session identifier. The user group is created, comprising the user identifiers of the plurality of users and a name for said user group. The user group is stored in memory. A computing device and a non-transitory computer readable medium configured to implement the method are also described.

23 Claims, 6 Drawing Sheets

(56) References Cited

U.S. PATENT DOCUMENTS

| | | | |
|---|---|---|---|
| 2007/0248261 A1* | 10/2007 | Zhou | G06F 19/321 |
| | | | 382/154 |
| 2008/0241810 A1* | 10/2008 | Flores | G09B 5/00 |
| | | | 434/350 |
| 2010/0285441 A1* | 11/2010 | Hefferman | G09B 7/02 |
| | | | 434/350 |
| 2011/0169736 A1 | 7/2011 | Bolt et al. | |
| 2012/0023246 A1* | 1/2012 | Castro Castro | H04L 41/0893 |
| | | | 709/229 |
| 2012/0077172 A1* | 3/2012 | Watanabe | G09B 5/06 |
| | | | 434/308 |
| 2013/0004929 A1* | 1/2013 | Otwell | G09B 5/00 |
| | | | 434/350 |
| 2013/0122481 A1* | 5/2013 | Rovner | G09B 7/04 |
| | | | 434/350 |
| 2013/0224717 A1* | 8/2013 | Thun | G09B 5/00 |
| | | | 434/350 |
| 2013/0309648 A1* | 11/2013 | Park | G09B 5/00 |
| | | | 434/350 |
| 2014/0160153 A1* | 6/2014 | Singh | G06Q 10/101 |
| | | | 345/629 |
| 2014/0282107 A1* | 9/2014 | Hobbs | H04L 65/1069 |
| | | | 715/753 |
| 2015/0121231 A1* | 4/2015 | Edwardson | G11B 27/034 |
| | | | 715/732 |
| 2015/0269317 A1* | 9/2015 | Marcum | G06Q 50/24 |
| | | | 705/3 |
| 2015/0304330 A1* | 10/2015 | Soamboonsrup | G09B 5/08 |
| | | | 726/4 |
| 2016/0253912 A1* | 9/2016 | Heilman | G09B 5/08 |
| 2016/0301675 A1* | 10/2016 | Wiles | H04L 63/083 |

\* cited by examiner

DEFINING A USER GROUP DURING AN INITIAL SESSION

The present invention relates generally to defining a user group in a collaborative workspace and specifically to a system and method for defining a user group in a collaborative workspace during an initial session thereof. This application claims priority to U.S. Provisional Application No. 61/972,677 filed on Mar. 31, 2014.

BACKGROUND

With the proliferation of mobile computing devices, the opportunity exists to connect users together in a user group to provide a collaborative workspace. For example, in an educational environment, classrooms are often equipped with a presentation device, such as an interactive whiteboard (IWB) to facilitate interactive learning. As is known in the art, IWBs provide students with an opportunity to interact with the classroom material as well as learn to work together in teams.

Some IWB manufacturers also provide classroom response systems as an integrated part of their IWB products. Handheld "clickers" operating via infrared (IR) or radio frequency (RF) signals, for example, offer basic multiple choice and polling options.

By combining classroom response with an interactive whiteboard system, teachers can present material and receive feedback from students in order to direct instruction more effectively or else to carry out formal assessments. For example, a student may both solve a puzzle involving math concepts on the interactive whiteboard and later demonstrate his or her knowledge on a test delivered via the classroom response system. Some classroom response software can organize and develop activities and tests aligned with educational standards.

In addition to the basic clickers, more advanced clickers are capable of offer text and numeric responses and can export an analysis of student performance for subsequent review. Yet further, since most students have access to mobile computing devices, such as smart phones, tablets, notebook computers and the like, more sophisticated collaboration, beyond simple question and response, is possible.

However, since the mobile computing devices are not dedicated to the classroom response system, as are the clickers, determining which students and teacher belong to which class is a difficult problem that usually requires costly integration with a student information system. Often times, awkward and time consuming workarounds are required. For example, it may be required to export files from the student information system to a common format file and then import the common format file into the classroom response system. Such a process needs to be validated as errors and inconsistencies often arise during the export/import process. Alternatively, it may be required that the teachers manually enter information for each student in order to add them to the class.

It is therefore an object of the present invention at least to provide a novel collaborative workspace that facilitates quickly and easily creating a user group within a collaborative workspace.

SUMMARY OF THE INVENTION

In accordance with an aspect there is provided a computer implement method for creating a user group, the method comprising: generating a temporary session identifier for a first session associated with the user group; communicating the temporary session identifier to a display for presentation; receiving, from a plurality of users, requests to join the first session, the requests including the temporary session identifier; correlating user identifiers of the plurality of users with the temporary session identifier; creating the user group comprising the user identifiers of the plurality of users and a name for said user group; and storing the user group in memory.

In accordance with a further aspect there is provided a computing device comprising: a communication interface for communicating with other computing devices; memory for storing instruction; and a processor configured to execute the instructions, which cause the computing device to implement: generating a temporary session identifier for a first session associated with the user group; communicating the temporary session identifier to a display for presentation; receiving, from a plurality of users, requests to join the first session, the requests including the temporary session identifier; correlating user identifiers of the plurality of users with the temporary session identifier; creating the user group comprising the user identifiers of the plurality of users and a name for said user group; and storing the user group in memory.

In accordance with a further aspect of an embodiment there is provided a non-transitory computer readable medium having stored thereon instructions which, when executed by a computer cause the computer to implement: generating a temporary session identifier for a first session associated with the user group; communicating the temporary session identifier to a display for presentation; receiving, from a plurality of users, requests to join the first session, the requests including the temporary session identifier; correlating user identifiers of the plurality of users with the temporary session identifier; creating the user group comprising the user identifiers of the plurality of users and a name for said user group; and storing the user group in memory.

BRIEF DESCRIPTION OF THE DRAWINGS

Embodiments of the invention will now be described by way of example only with reference to the following drawings in which.

DETAILED DESCRIPTION OF THE EMBODIMENTS

Figure 1:
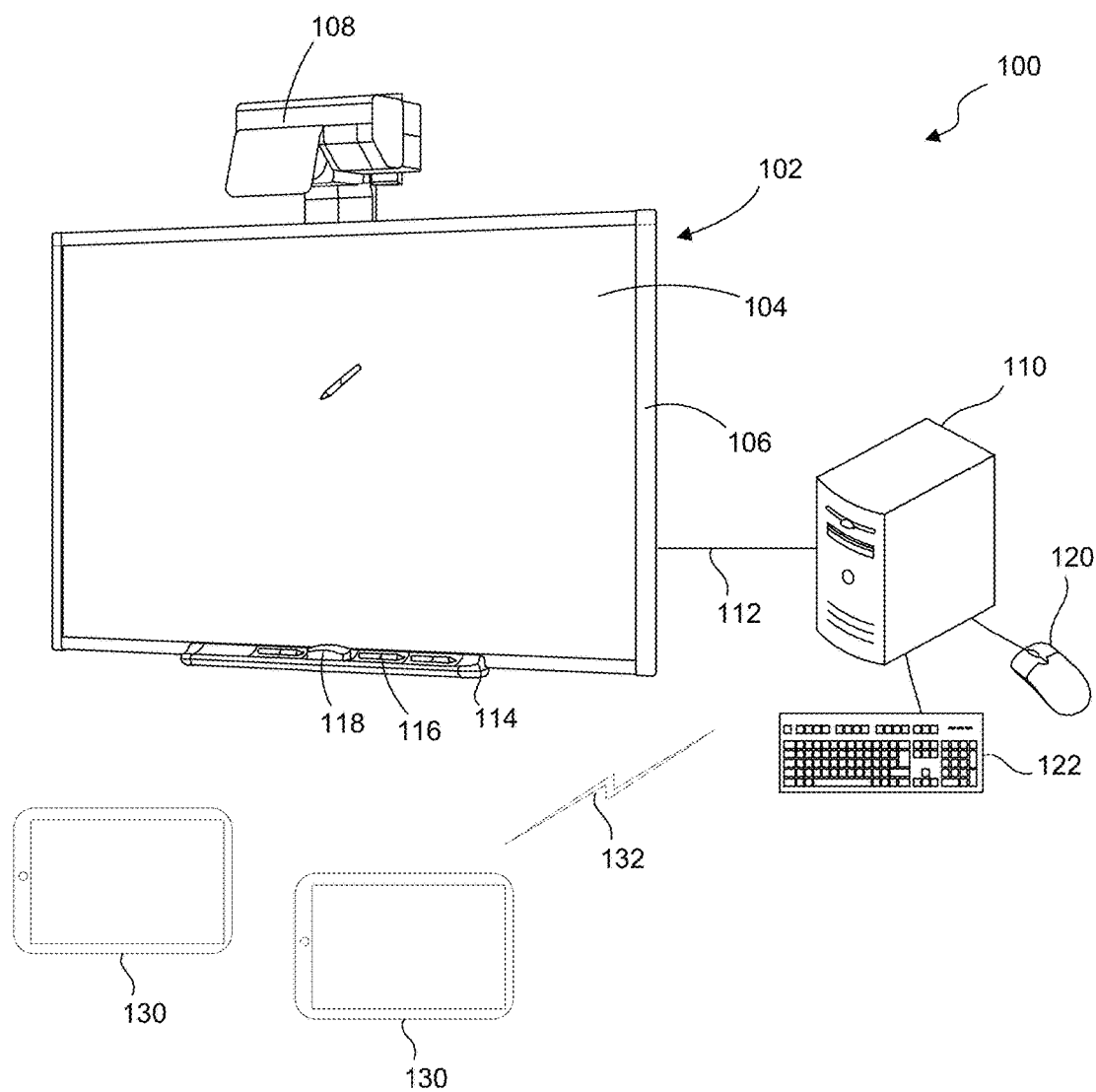
FIG. 1 is a diagram illustrating a collaborative interactive system.

For convenience, like numerals in the description refer to like structures in the drawings. Referring to FIG. 1, an collaborative interactive system is shown and is generally identified by reference numeral 100. Collaborative interactive system 100 allows a plurality of users to operate in a collaborative workspace in an executing application program. In this embodiment, collaborative interactive system 100 comprises an interactive display device 102 in the form of an interactive whiteboard (IWB) mounted on a vertical support surface such as a wall surface, for example, or the like. IWB 102 comprises a generally planar, rectangular interactive surface 104 that is surrounded about its periphery by a bezel 106. A projector 108 is mounted on a support surface above the IWB 102 and projects an image, such as a computer desktop for example, onto the interactive surface 104. In this embodiment, the projector 108 is an ultra-short-throw projector such as that sold by SMART Technologies ULC of Calgary, Alberta, Canada, assignee of the subject application, under the name "SMART UX60".

The IWB 102 employs machine vision to detect one or more pointers brought into a region of interest in proximity with the interactive surface 104. The IWB 102 communicates with a general purpose computing device 110, executing one or more application programs, via a suitable wired or wireless communication link 112. In this embodiment, the communication link 112 is a universal serial bus (USB) cable. Portable computing devices 130, executing one or more application programs, communicate with the general purpose computing device 110 via a suitable wired or wireless communication link 132. The portable computing devices 130 may comprise smart phones, notebook computers, tablets, or the like. In this embodiment, the communication link 132 is a wireless communication link such as a Wi-Fi™ link or a Bluetooth® link.

The general purpose computing device 110 processes output from the IWB 102 and adjusts image data that is output to the projector 108, if required, so that the image presented on the interactive surface 104 reflects pointer activity.

The bezel 106 is mechanically fastened to the interactive surface 104 and comprises four bezel segments that extend along the edges of the interactive surface 104. In this embodiment, the inwardly facing surface of each bezel segment comprises a single, longitudinally extending strip or band of retro-reflective material. To take best advantage of the properties of the retro-reflective material, the bezel segments are oriented so that their inwardly facing surfaces lie in a plane generally normal to the plane of the interactive surface 104.

A tool tray 114 is affixed to the IWB 102 adjacent the bottom bezel segment using suitable fasteners such as for example, screws, clips, adhesive etc. As can be seen, the tool tray 114 comprises a housing having an upper surface configured to define a plurality of receptacles or slots. The receptacles are sized to receive one or more pen tools 116 as well as an eraser tool 118 that can be used to interact with the interactive surface 104. Control buttons (not shown) are also provided on the upper surface of the tool tray housing to enable a user to control operation of the collaborative interactive system 100. Further specifics of the tool tray 114 are described in U.S. Patent Application Publication No. 2011/0169736 to Bolt et al., filed on Feb. 19, 2010, and entitled "INTERACTIVE INPUT SYSTEM AND TOOL TRAY THEREFOR", the content of which is incorporated herein by reference in its entirety.

Imaging assemblies (not shown) are accommodated by the bezel 106, with each imaging assembly being positioned adjacent a different corner of the bezel. Each of the imaging assemblies comprises an image sensor and associated lens assembly that provides the image sensor with a field of view sufficiently large as to encompass the entire interactive surface 104. A digital signal processor (DSP) or other suitable processing device sends clock signals to the image sensor causing the image sensor to capture image frames at the desired frame rate. During image frame capture, the DSP also causes an infrared (IR) light source to illuminate and flood the region of interest over the interactive surface 104 with IR illumination. Thus, when no pointer exists within the field of view of the image sensor, the image sensor sees the illumination reflected by the retro-reflective bands on the bezel segments and captures image frames comprising a continuous bright band. When a pointer exists within the field of view of the image sensor, the pointer occludes reflected IR illumination and appears as a dark region interrupting the bright band in captured image frames.

The imaging assemblies are oriented so that their fields of view overlap and look generally across the entire interactive surface 104. In this manner, any pointer such as for example a user's finger, a cylinder or other suitable object, a pen tool 116 or an eraser tool 118 lifted from a receptacle of the tool tray 114, that is brought into proximity of the interactive surface 104 appears in the fields of view of the imaging assemblies and thus, is captured in image frames acquired by multiple imaging assemblies. When the imaging assemblies acquire image frames in which a pointer exists, the imaging assemblies convey pointer data to the general purpose computing device 110.

The general purpose computing device 110 in this embodiment is a personal computer or other suitable processing device comprising, for example, a processing unit, system memory (volatile and/or non-volatile memory), other non-removable or removable memory (e.g., a hard disk drive, RAM, ROM, EEPROM, CD-ROM, DVD, flash memory, etc.) and a system bus coupling the various computer components to the processing unit. The general purpose computing device 110 may also comprise wired networking capabilities, such as Ethernet for example, and wireless networking capabilities, such as Wi-Fi™ and Bluetooth® for example, and/or other suitable network formats, to enable connection to shared or remote drives, one or more networked computers, or other networked devices. A mouse 120 and a keyboard 122 are coupled to the general purpose computing device 110.

For the IWB 102, the general purpose computing device 110 processes pointer data received from the imaging assemblies to resolve pointer ambiguity by combining the pointer data detected by the imaging assemblies, and to compute the locations of pointers proximate the interactive surface 104 (sometimes referred as "pointer contacts") using well-known triangulation. The computed pointer locations are then recorded as writing or drawing or used as an input command to control execution of an application program as described above.

In addition to computing the locations of pointers proximate to the interactive surface 104, the general purpose computing device 110 also determines the pointer types (e.g., pen tool, finger or palm) by using pointer type data received from the IWB 102. Here, the pointer type data is generated for each pointer contact by at least one of the imaging assembly DSPs by differentiating a curve of growth derived from a horizontal intensity profile of pixels corresponding to each pointer tip in captured image frames. Specifics of methods used to determine pointer type are disclosed in U.S. Pat. No. 7,532,206 to Morrison, et al., and assigned to SMART Technologies ULC, the content of which is incorporated herein by reference in its entirety.

Figure 2:
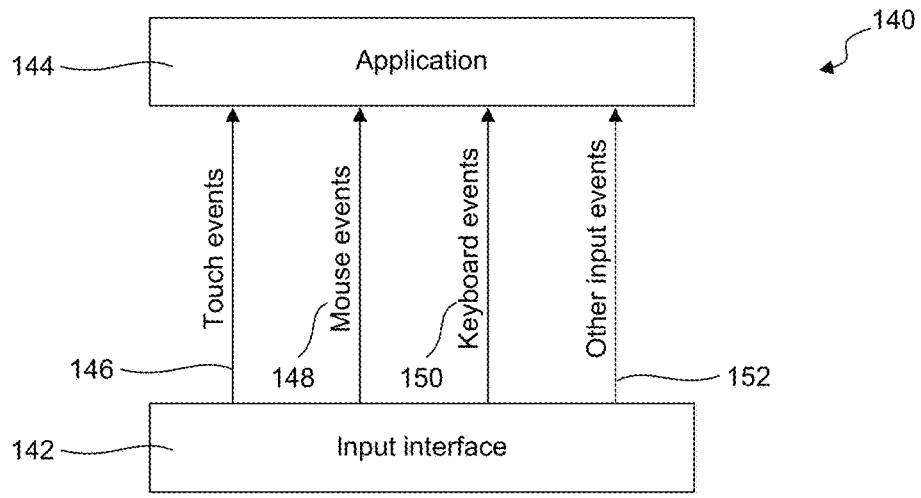
FIG. 2 is a diagram is an exemplary software architecture used by the collaborative interactive system.

Referring to FIG. 2 an exemplary software architecture used by the collaborative interactive system 100 is shown and is generally identified by reference numeral 140. The software architecture 140 comprises an input interface layer 142 and an application layer 144 comprising one or more application programs. The input interface layer 142 is configured to receive input from various input sources generated from the input devices of the interactive input system 100. The input devices include the IWB 102, the mouse 120, the keyboard 122, and other input devices, depending on the implementation. The input interface layer 142 processes received input and generates input events, such as touch events 146, mouse events 148, keyboard events 150 and/or other input events 152. The generated input events are then transmitted to the application layer 144 for processing.

The application layer includes a collaborative application that facilitates collaboration between a plurality of different users when the users' portable computing devices 130 are remotely coupled to the computing device 110. The details of the collaboration application may vary depending on the implementation. In this embodiment, the collaborative application is a web-based application. The collaborative application is identified by a unique Uniform Resource Identifier (URI) such as a Uniform Resource Locator (URL). In this context the general purpose computing device 110 can also be considered as a web server. Each of the portable computing devices 130 includes a web browser that facilitates access to the web server 110. In this context, the portable computing devices 130 can be considered web clients.

The web server 110 stores user information for each of the users who are permitted to access the collaborative interactive system 100. The user information includes authentication information such as username and password. In this embodiment, user information for each of the users is collected during an initial registration. That is, the user can access the web server 110 by inputting its associated URI in the web browser of the portable computing device. The URI directs the web browser to web page that will provide the user with an opportunity to register with the web server 110. Any number of known methods for registering users with the server 110 may be employed. For example, the user may register with an e-mail address and the server 110 may send an e-mail message to the e-mail address for verification. As another example, the server 110 may have a preprogrammed list of potential users and corresponding unique user identifiers that are pre-assigned to the users. Thus, upon registration the user enters his or her name and pre-assigned user identifier. The entered name and pre-assigned user identifier may be cross-referenced with the preprogrammed list for verification. Other methods of verification will become apparent to a person skilled in the art. Further, as will be appreciated, some of the users are identified as "group leaders". Group leaders will be provided with the option to create a group. For example, in an educational institution, teachers and other administrative staff may be identified as group leaders.

Figure 3:
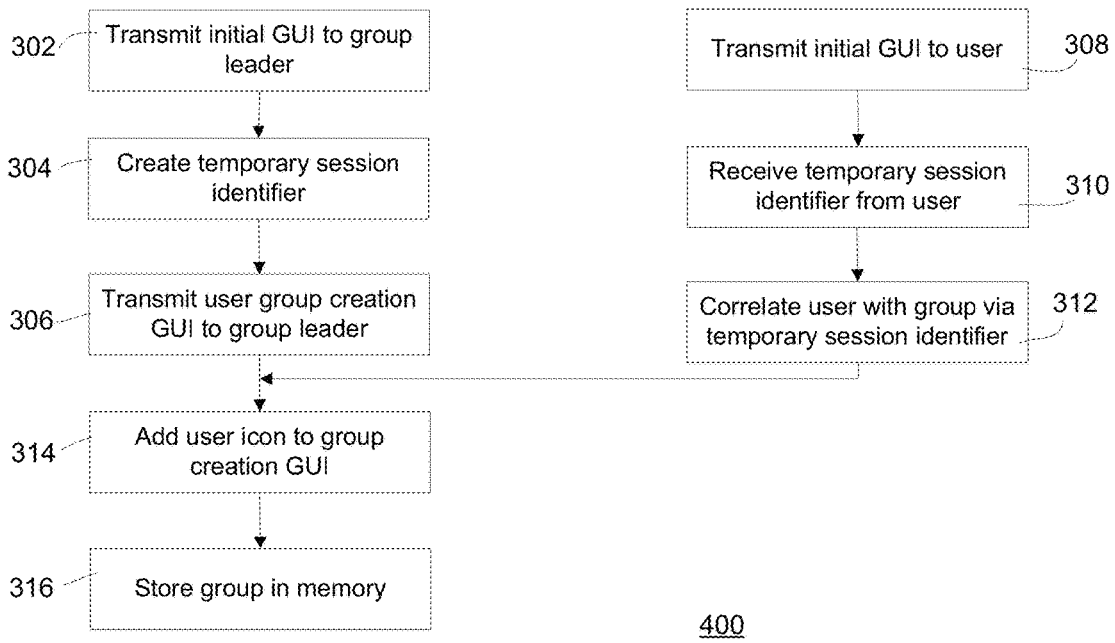
FIG. 3 is a flow chart illustrating how the user groups are created.

Referring to FIG. 3, a flow chart illustrating how the user groups are created is shown generally by numeral 300. At step 302, when a group leader logs in to his or her account, the web server 110 retrieves an initial graphical user interface (GUI) and communicates the initial GUI to a display for presentation to the group leader. In an embodiment, the display is the IWB 102. The initial GUI serves as a home screen for the collaboration application and includes a link to a user group creation GUI for creating a new user group. As will be appreciated, the link may be selected by clicking on hypertext, clicking on a button, selecting the link from a menu bar or the like.

At step 304, in response to the group leader selecting the link, the web server 110 creates a temporary session identifier. As will be appreciated by a person of ordinary skill in the art, the temporary session identifier has to be "unique" to the extent that there will not be any collisions between temporary session identifiers for different user groups. Accordingly, temporary session identifiers may be reused and long as sufficient time passes between use to inhibit collisions. In one embodiment, the temporary session identifier is a code that is represented as one or both of a string of text or a barcode. The barcode may be a two-dimensional barcode or matrix barcode such as a Quick Response (QR) code. In other embodiments, randomly or semi-randomly generated unique identifiers such as Globally Unique Identifiers (GUIDs) may be used as session identifiers.

At step 306, the web server 110 retrieves the user group creation GUI and communicates it to the display for presentation to the group leader. The user group creation GUI includes a field that allows the group leader to assign a name to the user group. The user group creation GUI also includes the temporary session identifier. In the embodiment of FIG. 1, since the display is the IWB 102, the user group creation GUI including the temporary session identifier is visible to users, in addition to the group leader, who can see the IWB.

At step 308 when the users logs in to their accounts, the web server 110 retrieves the initial graphical user interface (GUI) communicates the initial GUI to the for presentation to the users on a display of the corresponding portable computing devices 130. The initial GUI includes user group access section to facilitate joining a new user group. Specifically, the user group access section includes a field that allows the user input the temporary session identifier and a button to join the group identified by the temporary session identifier.

At step 310, in response to the user request to join the user group identified by the temporary session identifier, the web server 110 receives the temporary session identifier from the users. At step 312, the web server 110 correlates the username of the user with the user group associated with the temporary session identifier. Only users that provide the correct session identifier will be authenticated and allowed to join the session. At step 314, the web server 110 adds a user icon representing the user to the user group creation GUI. In this manner, the group leader is presented with a visual representation of the users who have joined the group in the initial session. The user icon may comprise a generic avatar along with the user's name, a customized avatar, with or without the user's name, a profile picture associated with the user, with or without the user's name, and the like. The web server 110 dynamically adds the user icons to the user group creation GUI as new users join the user group.

At step 316, once the group leader determines that the user group is complete the group leader selects a link to create the user group. The particular input to request the creation of the user group may involve other input mechanisms such as pressing a button, click on a hyperlink, a gesture input, touch input, mouse input, keyboard input, hover input, and the like. In response to the request to create the user group, the web server 110 stores in memory the user group information, including the title or name of the user group along with all the usernames of the users who are part of the user group.

Accordingly, when the group leaders or the group users subsequently access the web server 110, they will be presented with an option to access any one of the user groups already created and to which they have previously joined.

Figure 4:
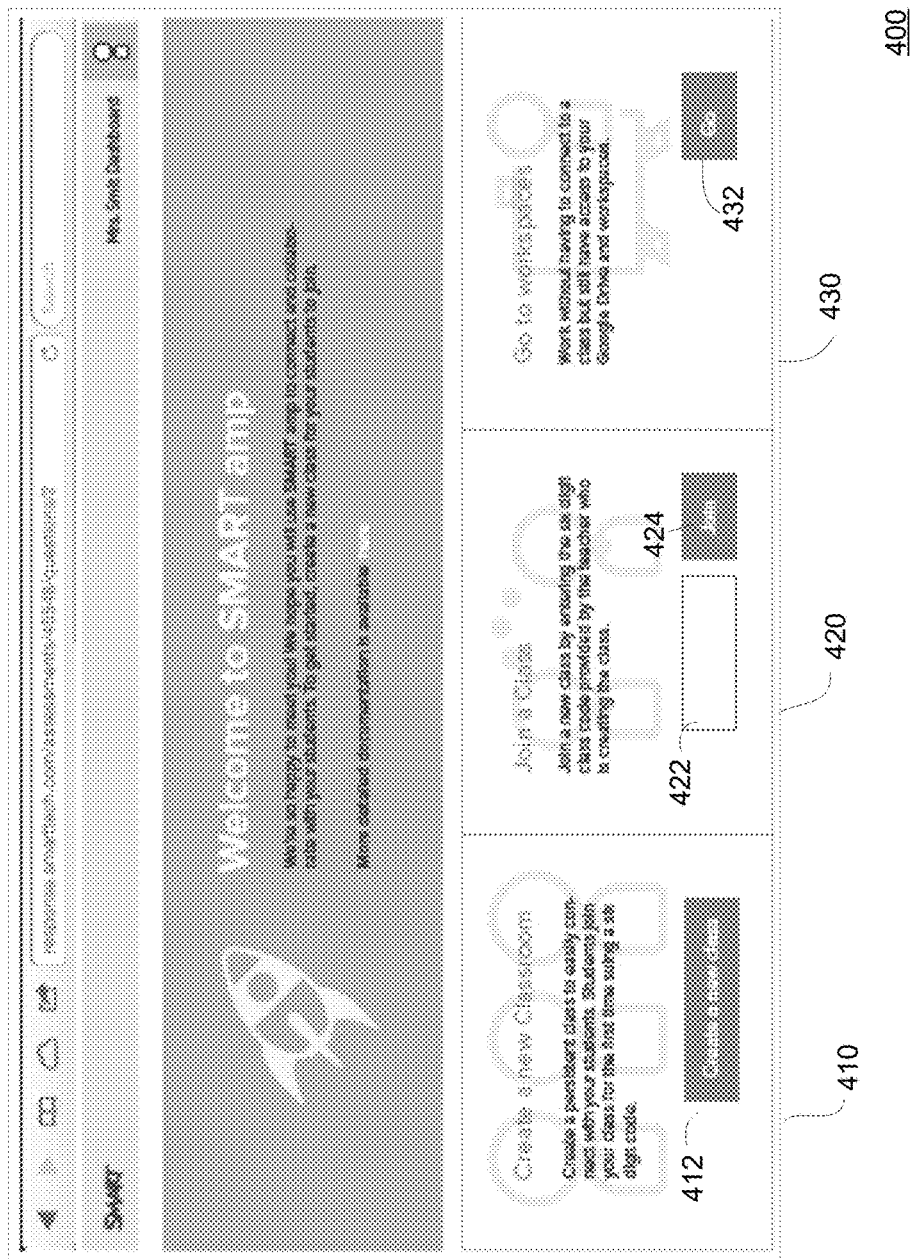
FIG. 4 is a screen shot of a sample home screen graphical user interface (GUI)

Referring to FIG. 4, a screen shot of a sample home screen GUI is illustrated generally by numeral 400. In this example, the user group is a class or a course in a school, the group leader is a teacher for the class and the users are the students in the class. Further, in this example, the teacher, or student, has not yet joined any classes for the course. The home screen GUI 400 comprises 3 sections: a create class section 410, a join class section 420, and an access workspaces section 430. The access workspaces section 430 includes a go button 432. The go button directs the user to a workspace GUI in order to access existing resources without joining a class. The join class section 420 includes a text box 422 and a join button 424. The text box 422 allows the user to enter the temporary session identifier and the join button 424 causes the contents of the text box 422 to be communicated to the web server 110. The create group section 410 includes a create class button 412 which causes the web server 110 to retrieve the user group creation GUI.

Figure 5:
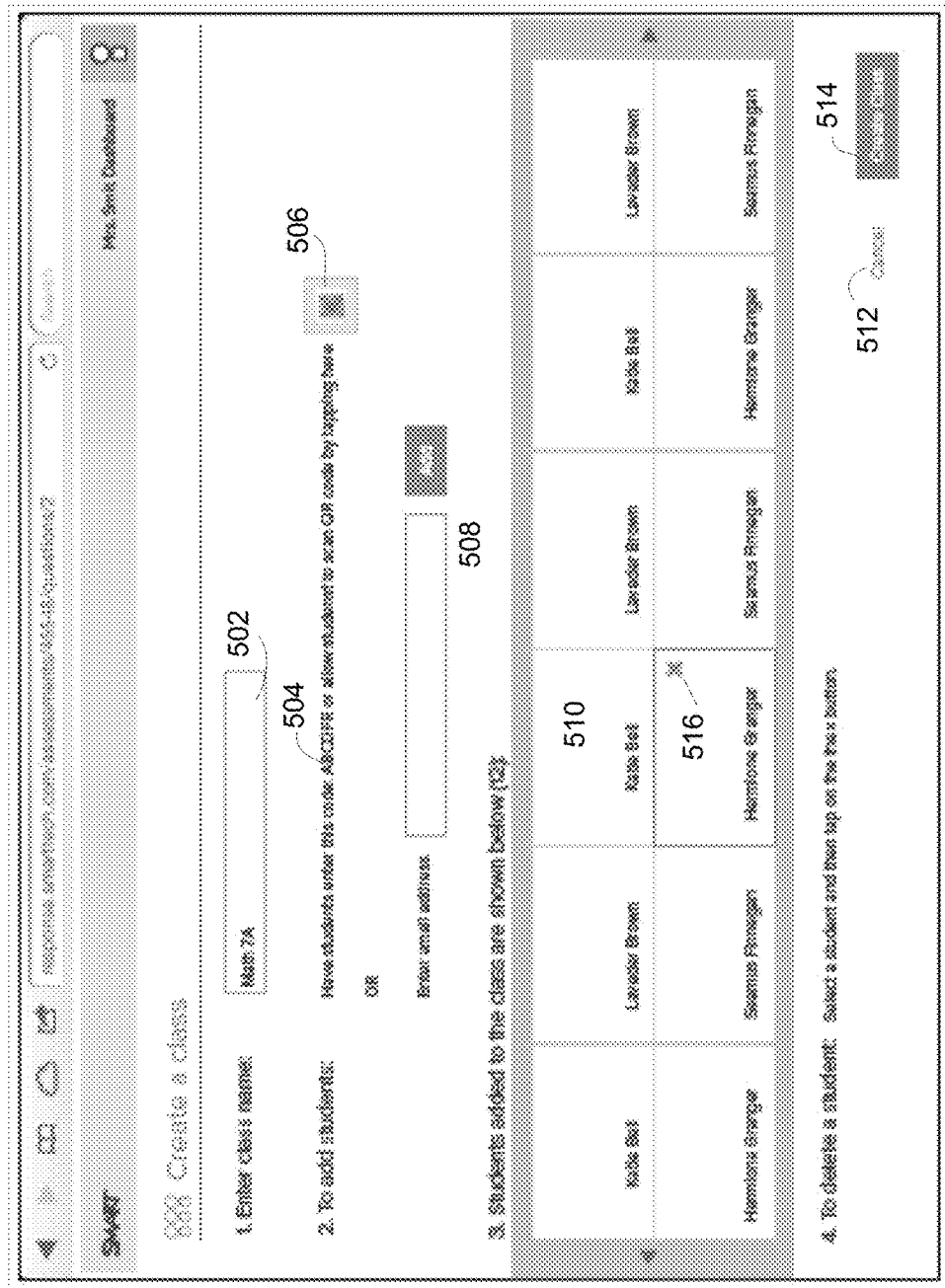
FIG. 5 is a screen shot of a sample user group creation GUI.

Referring to FIG. 5, a screen shot of a sample user group creation GUI is illustrated generally by numeral 500. Continuing the example described with reference to FIG. 4, the user group is a course, the group leader is the teacher and the users are the students. The user group creation GUI 500 comprises a course or class name textbox 502, a temporary session identifier label 504, a QR code button 506, an add user textbox 508, a plurality of icons 510, a cancel button 512 and a create class button 514.

The course or class name textbox 502 allows the teacher to enter a class name to be assigned to the course. In this example, the class or course name is "Math 7A". The temporary session identifier label 504 comprises the string of text representing the temporary session identifier. The QR code button 506 causes the QR code representing the temporary session identifier to be displayed.

The plurality of icons 510 are the user icons that represents the students that that have joined the current session (for example, the first class) of the course. The teacher has the ability to delete one of the students by selecting the corresponding one of the icons 510. When the icon 510 is selected a deletion icon 516, represented as a small "x", is presented at a corner of the icon 510. If the teacher selects the deletion icon 516, the student is removed from the class.

The cancel button 512 cancels creation of the class. The create class or create course button 512 instructs the web server 110 to create a course having the name identified in the course name textbox 502 and including the teacher as well as the students identified by the icons 510.

In an embodiment, the add user textbox 508 provides a mechanism by which the teacher can manually add students who are not present for the first class or session, or cannot view the temporary session identifier or QR code and thus cannot enter a valid session code to join the session. By entering a student identifier such as username or e-mail address, students can readily be added to the class.

Figure 6:
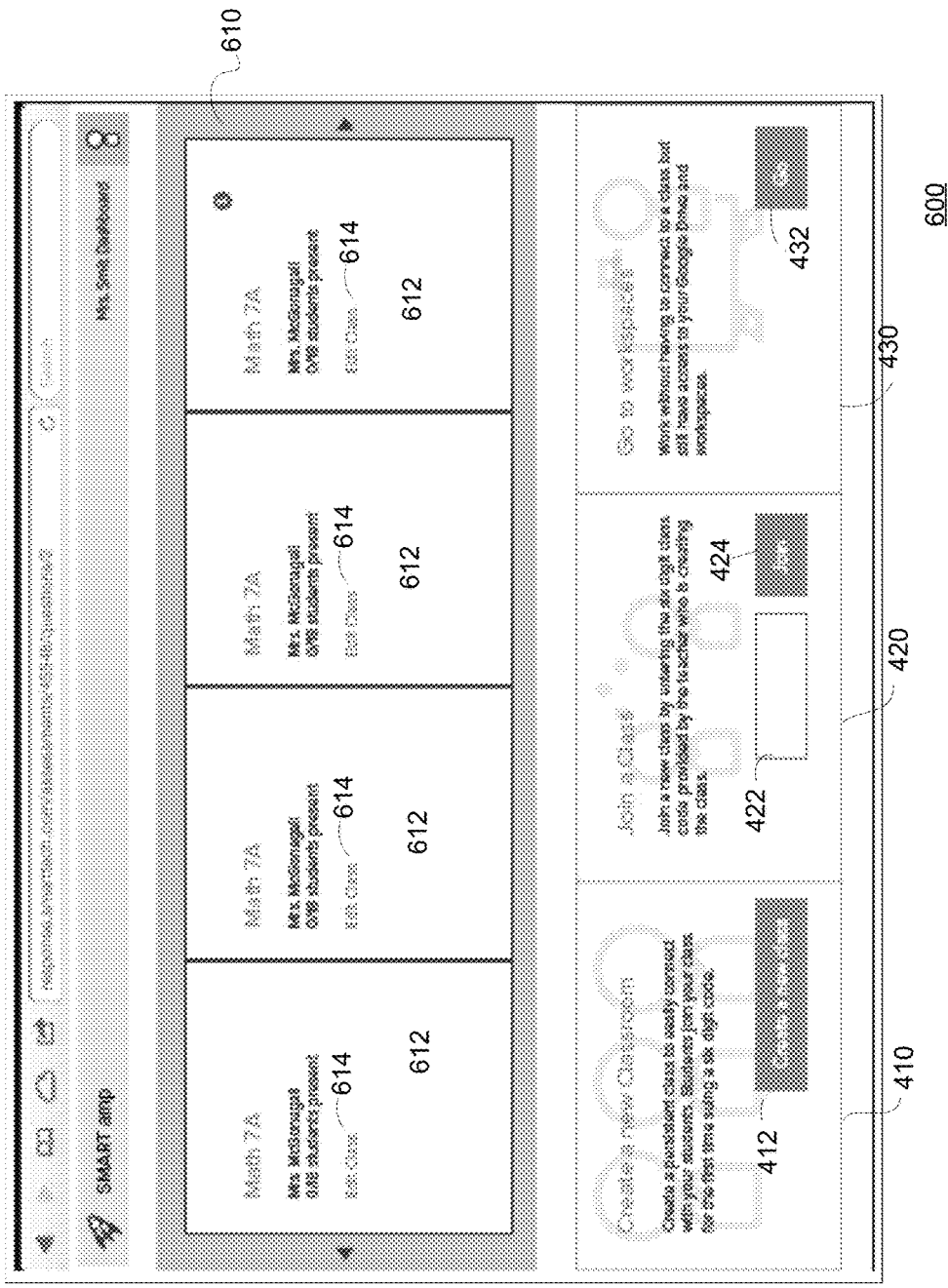
FIG. 6 is a screen shot of a sample home screen GUI after groups have been created.

Referring to FIG. 6, a screen shot of a sample home screen GUI is illustrated generally by numeral 600. Continuing the example described with reference to FIG. 4, the user group is a course or a class, the group leader is the class teacher and the users are the students. However, in this example, the teacher, or student, has joined one or more classes for one or more courses. Accordingly, the home screen GUI 600 includes a course list section 610. The course list section 610 identifies each of the courses 612 to which the teacher, or student, belongs. That is, the course list for a student includes all courses that the student is registered to attend, as a result of attending the first class for the course or by being manually added to the list of students for that course.

The course list also includes an edit button 614. In this embodiment, the edit button 614 is only visible to the teacher. The teacher, or student, can access one of the courses 612 by clicking on it. Optionally, the teacher can choose to edit the course list by selecting the edit button 614. Selection of the edit button 614 causes the web server 110 to retrieve the user group edit GUI.

Figure 7:
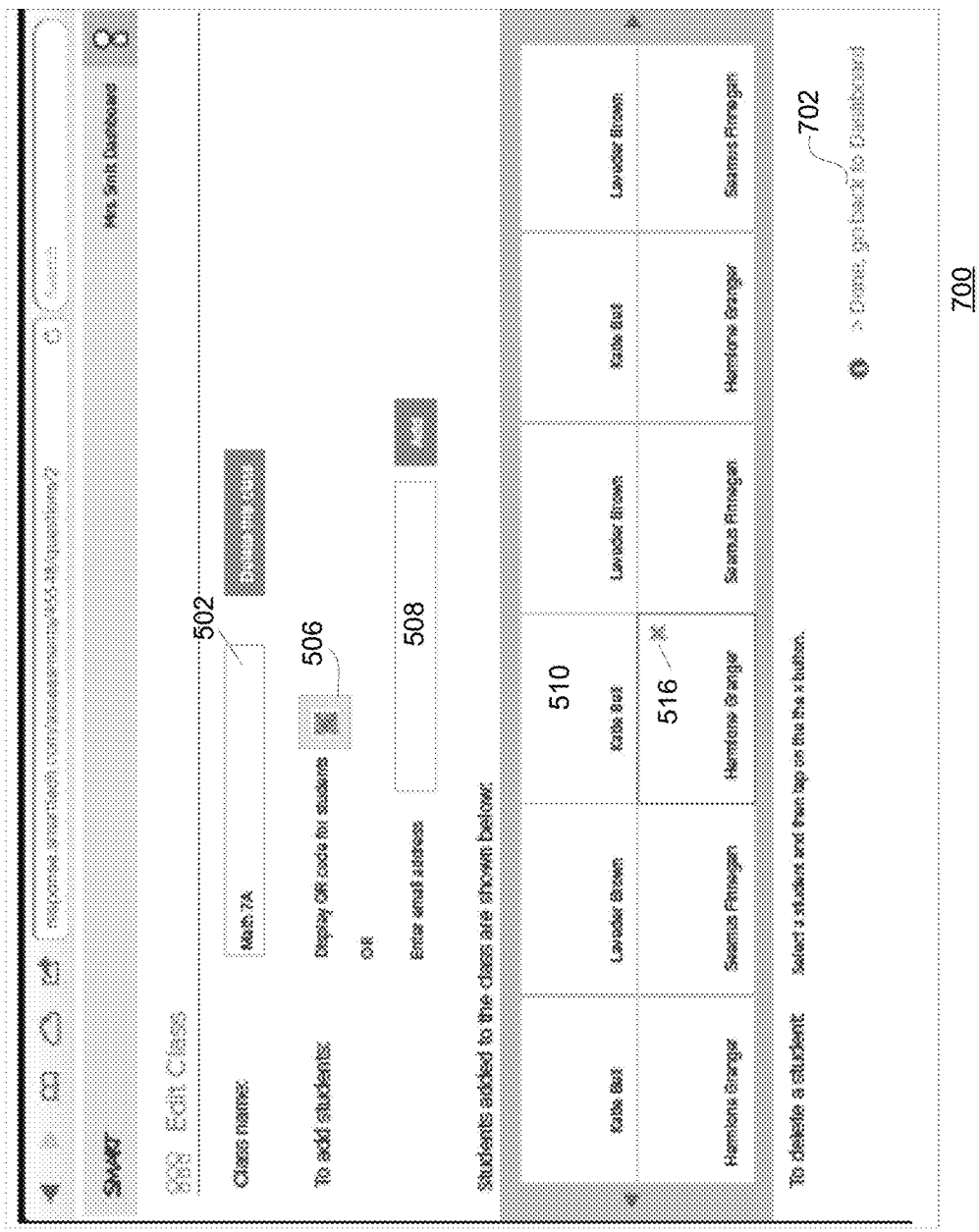
FIG. 7 is a screen shot of a sample user group edit GUI.

Referring to FIG. 7, a screen shot of a sample user group edit GUI is illustrated generally by numeral 700. Continuing the example described with reference to FIGS. 4, 5 and 6, the user group is a class, the group leader is the class teacher and the users are the students. The user group edit GUI 500 comprises the course name textbox 502, the QR code button 506, the add user textbox 508, the plurality of icons 510, and a save changes link 702. The user group edit GUI may also include the temporary session identifier label (not shown). The course name textbox 502 allows the teacher to assign a course name to the class. In this example, the course name is "Math 7A". The QR code button 506 causes the QR code representing the temporary session identifier to be displayed. The teacher can edit the class list by deleting or adding students. The students can be deleted as described above. That is, the teacher is provided with the plurality of icons 510 that represent the students and can select the deletion icon 516 to delete the student. Students can be added manually, as described above, by having the teacher ender the student's username or e-mail address into the add user text box 508. Alternatively, another temporary session identifier may be created and display to allow the student to associate himself or herself with the class. When the teacher is done, the teach selects the save changes link 702 and the web server 110 updates the class list stored in memory accordingly.

Accordingly, it will be appreciated that the embodiments described herein provide a simple and effective system and method for assigning users to a persistent user group in a collaborative workspace. Users that successfully login to the first session of the user group are stored as members of the roster for that user group. The group leader may delete or add users to the user group during the first session or a later time. For example, users can be added at subsequent sessions or from the persistent record of the class list or roster. Although the system and method have been described with reference to specific embodiment, those skilled in the art will appreciate that modifications can be made to the embodiments.

For example, in the embodiments described above, the collaborative application is implemented in a web browser. In an alternate embodiment, the collaborative application may be implemented as an "app". In this embodiment, a dedicated, lightweight client application is installed on each of the portable computing device 130. The client application is configured to communicate with the web server 110. Thus, rather than enter a URL into a web browser, the user opens the client application and a connection between the portable computing device 130 and the web server 110 is automatically established, if possible. Also, in such an embodiment, the home screen GUI 400 and 600, the user group GUI 500 and the user group edit GUI 700 may be stored in the client application on the portable computing device 130. Further only the content of the GUI data fields may be communicated between the portable computing device 130 and the web server 110.

Further, as previously noted, although specific examples are described with regard to education, other collaborative user groups may also benefit from such a system. Specifically, this same technique could be used anywhere where medium to long term groups need to be easily created. For example, consider a project group in a corporation that needs to share documents and discussions on a cloud-based service. All members could connect to a shared session during an initial meeting or session. That shared session could then be converted into a permanent workgroup or member list for the duration of the project. A project leader may add or delete users as needed at a later time.

Yet further, although in embodiments described above, the IWB is described as comprising machine vision to register pointer input, those skilled in the art will appreciate that other interactive boards employing other machine vision configurations, analog resistive, electromagnetic, capacitive, acoustic or other technologies to register input may be employed. Further, machine vision different to that described above may also be used.

Yet further, although the presentation screen described above is an IWB, the screen itself does not need to be interactive at all. Accordingly, the group leader can interact with the collaborative application via traditional input means, such as a keyboard, mouse, trackpad and the like.

Although embodiments have been described above with reference to the accompanying drawings, those of skill in the art will appreciate that variations and modifications may be made without departing from the scope thereof as defined by the appended claims.

The invention claimed is:

1. A computer implement method for creating a user group, the method comprising:
   generating a temporary session identifier for a first session associated with the user group;
   communicating the temporary session identifier to a display for presentation;
   receiving, from a plurality of users, requests to join the first session, the requests including the temporary session identifier;
   correlating user identifiers of the plurality of users with the temporary session identifier;
   creating the user group comprising the user identifiers of the plurality of users and a name for said user group; and
   storing the user group in memory.

2. The method of claim 1, wherein the temporary session identifier is generated in response to receiving a request from a group leader to create the user group.

3. The method of claim 2 further comprising receiving a group name for the user group from the group leader.

4. The method of claim 2, further comprising adding new users to the user group in response to an addition request from the group leader, the request including a student identifier.

5. The method of claim 1, wherein the user identifiers are included in the requests.

6. The method of claim 1, wherein the temporary session identifier is a unique identifier.

7. The method of claim 6, wherein the unique identifier is semi-randomly generated.

8. The method of claim 1 further comprising communicating user icons representing the plurality of users to the display for presentation.

9. The method of claim 8, wherein each of the user icons comprises:
   a generic user icon and a user name associated with a corresponding one of the plurality of users;
   a customized avatar; or
   a profile picture associated with the corresponding one of the plurality of users.

10. The method of claim 9, wherein the customized avatar or the profile picture further comprise the user name associated with the corresponding one of the plurality of users.

11. The method of claim 8, further comprising deleting a selected of the plurality of users from the user group in response to a deletion request.

12. A non-transitory computer readable medium having stored thereon instructions which, when executed by a computing device, cause the computing device to:
   generate a temporary session identifier for a first session associated with a user group;
   communicate the temporary session identifier to a display for presentation;
   receive, from a plurality of users, requests to join the first session, the requests including the temporary session identifier;
   correlate user identifiers of the plurality of users with the temporary session identifier;
   create the user group comprising the user identifiers of the plurality of users and a name for said user group; and
   store the user group in memory.

13. The computer readable medium of claim 12, wherein the temporary session identifier is generated in response to receiving a request from a group leader to create the user group.

14. The computer readable medium of claim 13 further comprising instructions to receive a group name for the user group from the group leader.

15. The computing device of claim 13, further comprising adding new users to the user group in response to an addition request from the group leader, the request including a student identifier.

16. The computer readable medium of claim 12, wherein the user identifiers are included in the requests.

17. The computer readable medium of claim 12, wherein the temporary session identifier is a unique identifier.

18. The computer readable medium of claim 17, wherein the unique identifier is semi-randomly generated.

19. The computer readable medium of claim 12 further comprising instructions to communicate user icons representing the plurality of users to the display for presentation.

20. The computer readable medium of claim 19, wherein each of the user icons comprises:
   a generic user icon and a user name associated with a corresponding one of the plurality of users;
   a customized avatar; or
   a profile picture associated with the corresponding one of the plurality of users.

21. The computer readable medium of claim 20, wherein the customized avatar or the profile picture further comprise the user name associated with the corresponding one of the plurality of users.

22. The computer readable medium of claim 19, further comprising instruction to delete a selected of the plurality of users from the user group in response to a deletion request.

23. A computing device comprising:
   a communication interface for communicating with other computing devices;
   memory for storing instructions; and
   a processor configured to execute the instructions, which cause the computing device to:
      generate a temporary session identifier for a first session associated with the user group;
      communicate the temporary session identifier to a display for presentation;

receive, from a plurality of users, requests to join the first session, the requests including the temporary session identifier;
correlate user identifiers of the plurality of users with the temporary session identifier;
create the user group comprising the user identifiers of the plurality of users and a name for said user group; and
store the user group in the memory.

* * * * *